F. L. GEORGE.
SELF ADJUSTING WIRE FLANGE FOR PIANO ACTIONS.
APPLICATION FILED JULY 22, 1920.
1,382,828.
Patented June 28, 1921.
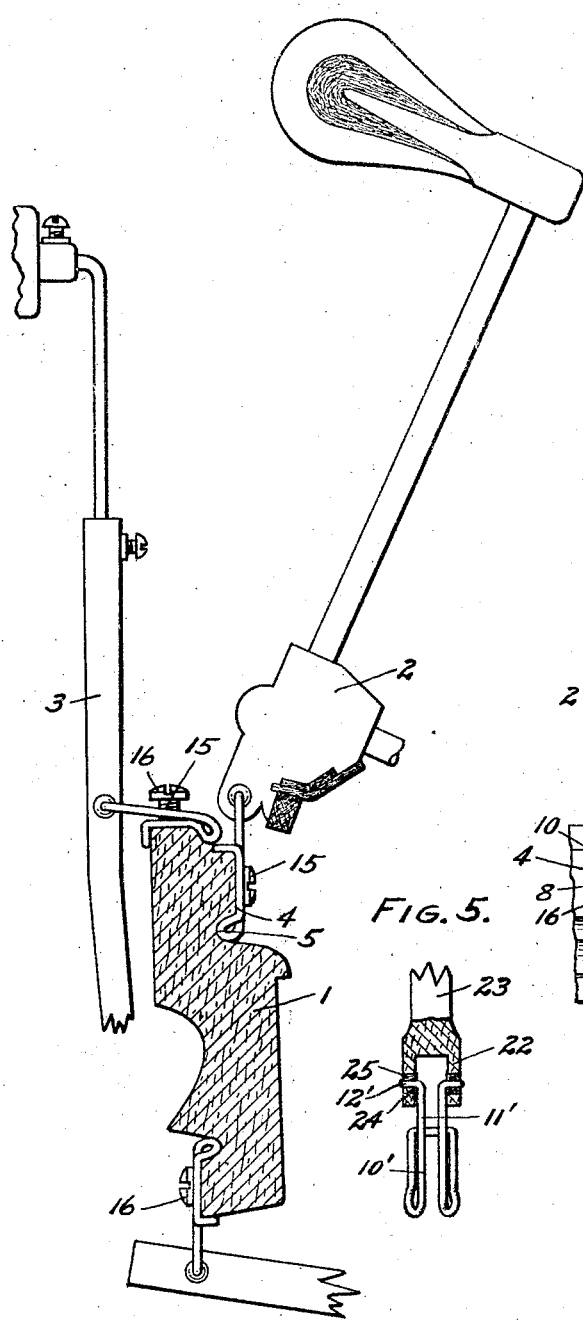
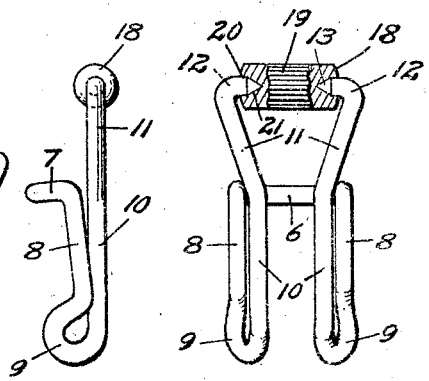
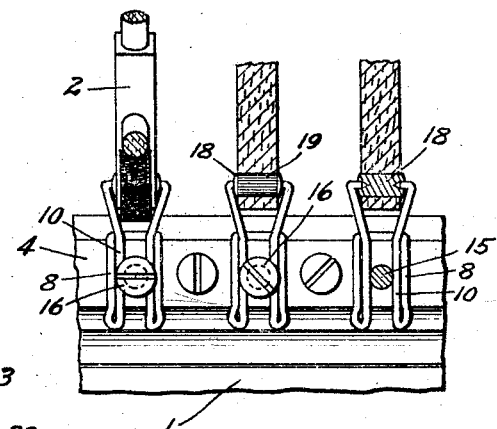
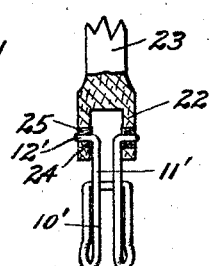
INVENTOR.
FRANK L. GEORGE
BY
ATTORNEYS.

UNITED STATES PATENT OFFICE.

FRANK L. GEORGE, OF LOS ANGELES, CALIFORNIA, ASSIGNOR OF ONE-FOURTH TO BURTON J. NEILL, OF SAN FRANCISCO, CALIFORNIA.

SELF-ADJUSTING WIRE FLANGE FOR PIANO-ACTIONS.

1,382,828. Specification of Letters Patent. Patented June 28, 1921.

Application filed July 22, 1920. Serial No. 398,235.

*To all whom it may concern:*

Be it known that I, FRANK L. GEORGE, a citizen of the United States, residing at Los Angeles, in the county of Los Angeles and State of California, have invented new and useful Improvements in Self-Adjusting Wire Flanges for Piano-Actions, of which the following is a specification.

This invention is a flange for piano actions and has for its object the provision of a wire flange adapted to eliminate the use of wooden flanges as now used.

It is a further object of the invention to provide an improved bearing bushing for the flange.

In the present construction of piano actions serious damage and annoyance is caused by atmospheric influence upon the wooden flanges employed in the piano action as well as the atmospheric influence upon the felt bushings and center pins employed in connection with such flanges. Atmospheric moisture is readily absorbed by these parts causing swelling of the wooden flanges and felt bushings which in turn bind upon the center pins so as to cause either sluggish movement or complete binding of the piano action. On the other hand extreme dryness or heat will affect these parts in opposite manner for causing the flanges and bushings to shrink and thereby rattle on the screws which screw the flanges to the flange rail.

A further disadvantage of the usual flange construction consists of the tendency of the felt bushings to wear and thereby cause the center pins received through said bushings to shake and vibrate. Furthermore, there is a tendency of the wooden part in which the center pins are anchored to shrink so as to allow the center pins to become loose and creep from the felt bushings. As a result the members supported by the pins will become out of alinement and thereby interfere with the proper action of one another.

By the provision of an improved wire flange and bearing bushing I have eliminated the effects of all atmospheric influence and have thereby obviated the sticking or rattling of flanges under all such adverse conditions. Furthermore, I have provided a greatly simplified construction in which friction is reduced to a minimum. The improved construction also provides a flange and bushing which may be readily set in position and as readily removed. A saving of labor in installing as well as a saving of material in manufacturing is thus obtained.

The invention will be readily understood from the following description of the accompanying drawings, in which—

Figure 1 is a fragmentary transverse section through the main action rail of an upright piano action showing the improved wire flange and bearing bushing connecting various ones of the usual members to the main action rail.

Fig. 2 is a front elevation of a portion of the main action rail showing several of the hammer butts connected thereto by means of the improved flanges.

Fig. 3 is a side elevation of one of the improved flanges and bearing bushing.

Fig. 4 is a front elevation of the same showing the bearing bushing in longitudinal section.

Fig. 5 is a modified form of the improved flange showing its connection to a usual wooden member having the center pin hole provided with usual felt bushings.

In the drawings I have shown a main flange rail at 1 having the various movable elements such as hammer butts 2 and damper levers 3 associated therewith. These movable elements as well as the other movable elements throughout the piano action are connected to the various supporting rails by means of the improved flange and bushing bearing. For this purpose at each of the points upon the supporting rails where a movable element is to be pivotally connected the supporting rail is cut away to provide an off-set contact surface 4. At the end of this contact surface away from the movable element pivotally connected thereto, a transverse recess 5 is formed in the contact surface.

The improved flange adapted to be pivotally connected to a movable element is secured against contact surface 4 of the supporting rail, said flange being arranged to provide a yieldable tension against the retaining screw which holds the flange in position. As a result provision is made for any shrinkage or swelling of the parts in response to atmospheric influence. As an instance of this arrangement the flange is shown as formed of a wire as shown in Figs. 3 and 4. The wire is bent midway of its length to provide a transverse loop portion 6 having portions at each side thereof bent relative to said loop as shown at 7. The respective ends of the wire are then angularly disposed as shown at 8 with loops 9 at the ends thereof, as clearly shown in Fig. 3. Beyond the loops the wire ends form lengths 10 lying substantially parallel to the portions 8 of the wire.

The ends of the lengths 10 beyond loop 6 are, preferably, transversely outwardly flared as shown at 11 with the ends thereof inwardly bent as shown at 12 so as to lie in transverse spaced relation and in transverse alinement with one another. The points of these ends are, preferably, tapered as shown at 13.

The flange as thus constructed is mounted upon supporting rail 1 with the portions 8 and 10 of said flange resting against contact surface 4 and the loop 9 of the flange received in recess 5. The outwardly bent portion 7 and the loop 6 of the flange abut against the end of the supporting rail beyond the contact surface, and the tapering transversely spaced bearing prongs of the flange extend beyond the supporting rail for pivotal engagement with the movable element of the piano action.

A screw 15 having the head 16 is received between the portions 8 and 10 of opposite sides of the flange and is threaded into the supporting rail 1. The screw is screwed down until its head 16 contacts against the longitudinal extensions 10 of the flange. These longitudinal extensions of the flange in turn abut against the ends of the portions 8 of the flange at their junction with the portions 7 of the flange. The abutment of the head of screw 15 against the flange is thus arranged to retain the flange in position upon the supporting rail. The tension of the flange caused by the abutment of spring loops 9 in recess 5 will cause the angularly disposed portions 8 of the flange to be urged toward contact surface 4 and the longitudinal extensions 10 of the flange to be urged outwardly against the head 16 of the screw. By this arrangement the flange is adapted to yield and expand against the head of the retaining screw for rigidly holding the flange in position upon the supporting rail irrespective of possible swelling or shrinking of the supporting rail.

The pivotal connection provided between a movable element of the piano action and the ends of the flange is shown as comprising a bushing 18, preferably, provided with an outer knurled surface 19. The bushing is received through the movable element, the knurled surface thereof frictionally retaining the same in position, and the ends of said bushing which extend flush with or just beyond the sides of the movable element are provided with transversely alined bearing recesses 20 having conical inner ends 21. The parts are so relatively proportioned that these bearing recesses will form snugly fitting bearings for the tapering prongs 13 and portions of the ends 12 of the flange. When the flange ends are received in the bearings of the bushing the tension of transversely tapering portions 11 of the wire flange, caused by the abutment of said portions against the ends of the portions 8 of the flange, will cause the ends of the flange to tightly fit within the bearings of the bushing.

It will thus be seen that a firm bearing is provided for the flange ends in the bearing bushing and at the same time the flange is firmly secured to the supporting rail so as to adjust itself to variations in the supporting rail. The screw 15 contacting against the longitudinal extensions of the flange and received between the same will positively prevent lateral movement of the flange as well as movement of the same away from the contact surface of the supporting rail. The contact of the screw will also force the longitudinal extensions of the flange against the ends of the portions 8 thereof for placing the tapering continuations 11 and bearing prongs of the flange under tension. The spring tension throughout the various portions of the flange is thus arranged to provide for all variations arising from atmospheric conditions and the like so as to prevent any rattling or vibration of the parts.

In the modification of the invention illustrated in Fig. 5 the improved flange is shown used in conjunction with the usual form of bearing aperture for a usual center pin. The transversely spaced arms 22 of a movable element 23 of the piano action are shown provided with bearing apertures 24 in which are received the usual felt bushings 25. The bearing prongs 12' of the improved flange are bent outwardly instead of inwardly and are received through the respective felt bushings 25. In this form of the invention the continuations 11' of the flange are, preferably, in longitudinal alinement with the longitudinal extensions 10' thereof.

Various changes may be made without departing from the spirit of the invention as claimed.

What is claimed is:

1. In a piano action the combination with a supporting rail, of a movable element, a flange, means for positioning said flange on said supporting rail, and transversely expanding the same, said flange having bearing ends engaging said movable element to form a pivotal connection, said bearing ends being yieldably urged toward said movable element.

2. In a piano action the combination with a supporting rail of a movable element, a flange, and means for positioning said flange on said supporting rail and transversely expanding the same, said flange having a pivotal connection with the said movable element.

3. In a piano action the combination with a supporting rail of a movable element, a flange upon said supporting rail, said flange having bearing ends engaging said movable element to form a pivotal connection, said bearing ends being yieldably urged toward said movable element.

4. In a piano action the combination with a supporting rail of a movable element, an expandible flange, and means for positioning said flange on said supporting rail and adjustably pressing said flange against the supporting rail, said flange having a pivotal connection with the said movable element.

5. In a piano action the combination with a supporting rail of a movable element, a flange comprising a wire having portions engaging the supporting rail and reversely bent portions alongside the first mentioned portions of the wire, said reversely bent portions terminating in bearing ends yieldably urged toward one another and journaled in said movable member to form a pivotal connection; and retaining means engaging said reversely bent portions of the wire and said supporting rail, said retaining means being adjustable to press said flange against the supporting rail.

6. In a piano action the combination with a supporting rail of a movable element, a flange comprising a wire having portions engaging the supporting rail and reversely bent portions alongside the first mentioned portions of the wire, said flange having a pivotal connection with the said movable element, and retaining means engaging said reversely bent portions of the wire and said supporting rail, said retaining means being adjustable to press said flange against the supporting rail.

7. In a piano action the combination with a supporting rail of a movable element, a flange comprising a wire having portions engaging the face of said supporting rail, end portions bent over the edges of said rail and reversely bent portions alongside the first mentioned portions, said flange having a pivotal connection with the said movable element, and retaining means engaging said reversely bent portions and said supporting rail, said retaining means being adjustable to press said flange against the supporting rail.

8. In a piano action the combination with a supporting rail of a movable element, a flange upon said supporting rail comprising a wire having portions of the same alongside other portions and terminating in ends outwardly bent and then inwardly bent to form bearing ends yieldably urged toward one another, said bearing ends being journaled in said movable member to form a pivotal connection.

In testimony whereof I have signed my name to this specification.

FRANK L. GEORGE.